(12) United States Patent
Yamada et al.

(10) Patent No.: US 8,730,616 B2
(45) Date of Patent: May 20, 2014

(54) MAGNETIC RECORDING HEAD, HEAD GIMBAL ASSEMBLY WITH THE SAME, AND DISK DRIVE

(75) Inventors: Kenichiro Yamada, Tokyo (JP); Yusuke Tomoda, Zama (JP); Tomoko Taguchi, Kunitachi (JP); Katsuhiko Koui, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/585,285

(22) Filed: Aug. 14, 2012

(65) Prior Publication Data

US 2013/0250456 A1  Sep. 26, 2013

(30) Foreign Application Priority Data

Mar. 22, 2012  (JP) ................. 2012-066240

(51) Int. Cl.
*G11B 5/127* (2006.01)
(52) U.S. Cl.
USPC .................................... 360/125.3
(58) Field of Classification Search
USPC ........ 360/125.3, 125.31, 125.71, 125.74, 128
See application file for complete search history.

(56) References Cited

U.S. PATENT DOCUMENTS

| | | | |
|---|---|---|---|
| 7,957,098 B2 | 6/2011 | Yamada et al. | |
| 8,081,397 B2 | 12/2011 | Funayama et al. | |
| 2006/0209469 A1 | 9/2006 | Akimoto | |
| 2009/0052095 A1* | 2/2009 | Yamada et al. | 360/324 |
| 2009/0059423 A1* | 3/2009 | Yamada et al. | 360/122 |
| 2009/0316304 A1 | 12/2009 | Funayama et al. | |
| 2010/0007996 A1* | 1/2010 | Iwasaki et al. | 360/324 |
| 2010/0220415 A1* | 9/2010 | Yamada et al. | 360/319 |
| 2011/0141629 A1* | 6/2011 | Braganca et al. | 360/313 |
| 2011/0205655 A1* | 8/2011 | Shimizu et al. | 360/39 |
| 2011/0299192 A1 | 12/2011 | Yamada et al. | |
| 2011/0300409 A1 | 12/2011 | Yamada et al. | |
| 2012/0113543 A1* | 5/2012 | Shiimoto et al. | 360/75 |

FOREIGN PATENT DOCUMENTS

| | | |
|---|---|---|
| JP | 2006-260687 A | 9/2006 |
| JP | 2009-070541 A | 4/2009 |
| JP | 2010-003353 A | 1/2010 |
| JP | 2011-086342 A | 4/2011 |

\* cited by examiner

*Primary Examiner* — Wayne Young
*Assistant Examiner* — Adam B Dravininkas
(74) *Attorney, Agent, or Firm* — Knobbe Martens Olson & Bear LLP (57) ABSTRACT

According to one embodiment, a magnetic recording head includes a main pole, a trailing shield opposing the main pole with a write gap therebetween, and a high-frequency oscillator between a distal end portion of the main pole and the trailing shield configured to produce a high-frequency magnetic field. The high-frequency oscillator includes a lower end surface facing the recording medium and an upper end surface substantially parallel to the lower end surface. The width of the lower end surface in a track-width direction is smaller than that of the upper end surface.

12 Claims, 11 Drawing Sheets

MAGNETIC RECORDING HEAD, HEAD GIMBAL ASSEMBLY WITH THE SAME, AND DISK DRIVE

CROSS-REFERENCE TO RELATED APPLICATIONS

This application is based upon and claims the benefit of priority from prior Japanese Patent Application No. 2012-066240, filed Mar. 22, 2012, the entire contents of which are incorporated herein by reference.

FIELD

Embodiments described herein relate generally to a magnetic recording head for perpendicular magnetic recording used in a disk drive, a head gimbal assembly provided with the same, and the disk drive.

BACKGROUND

A disk drive, such as a magnetic disk drive, comprises a magnetic disk, spindle motor, magnetic head, and carriage assembly. The magnetic disk is disposed in a case. The spindle motor supports and rotates the disk. The magnetic head reads data from and writes data to the disk. The carriage assembly supports the head for movement relative to the disk. A head section of the magnetic head comprises a recording head for writing and a reproduction head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, return or write/shield pole, and coil. The return pole is located on the trailing side of the main pole with a write gap therebetween and configured to close a magnetic path that leads to a magnetic disk. The coil serves to pass magnetic flux through the main pole.

To improve the recording density, a high-frequency magnetic field assisted recording head is proposed, in which a spin-torque oscillator for use as a high-frequency oscillator is disposed between the main pole and trailing shield such that a high-frequency magnetic field from the oscillator is applied to a magnetic recording layer. Drive current is supplied to the high-frequency oscillator, and magnetization of a generating layer is generated with sufficient amplitude. In this way, a large high-frequency magnetic field can be produced such that a stable recording/reproduction characteristic can be achieved.

A greater high-frequency magnetic field intensity is required to achieve a higher recording density and more stable recording/reproduction characteristic, and a higher drive current is required for this purpose. If the drive current is increased, however, the high-frequency oscillator is gradually degraded, so that it may become difficult to achieve a stable recording/reproduction characteristic, in some cases.

DETAILED DESCRIPTION

Various embodiments will be described hereinafter with reference to the accompanying drawings. In general, according to one embodiment, a magnetic recording head comprises: a main pole configured to apply a recording magnetic field to a recording layer of a recording medium; a trailing shield opposing the main pole with a write gap therebetween; and a high-frequency oscillator between a distal end portion of the main pole and the trailing shield, configured to produce a high-frequency magnetic field. The high-frequency oscillator comprising a lower end surface facing the recording medium and an upper end surface substantially parallel to the lower end surface, and the width of the lower end surface in a track-width direction is smaller than that of the upper end surface.

First Embodiment

Figure 1:
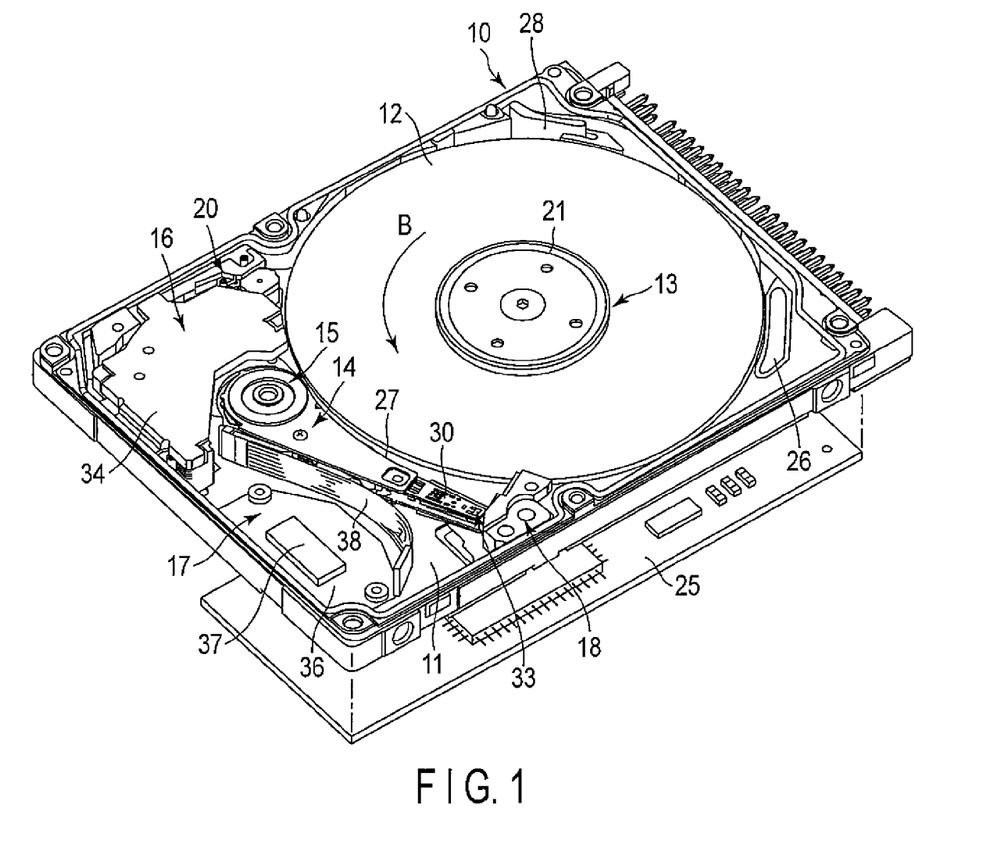
FIG. 1 is a perspective view showing a magnetic disk drive (HDD) according to a first embodiment.
Figure 2:
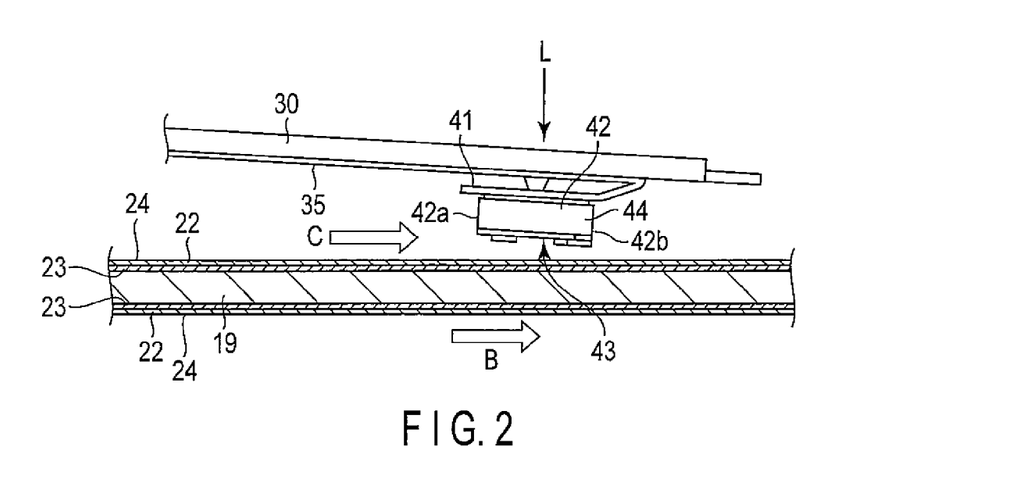
FIG. 2 is a side view showing a magnetic head and suspension of the HDD.

FIG. 1 shows the internal structure of a hard disk drive (HDD) as a disk drive according to a first embodiment with its top cover removed, and FIG. 2 shows a flying magnetic head. As shown in FIG. 1, the HDD comprises a housing 10. The housing 10 comprises a base 11 in the form of an open-topped rectangular box and a top cover (not shown) in the form of a rectangular plate. The top cover is attached to the base by screws such that it closes the top opening of the base. Thus, the housing 10 is kept airtight inside and can be ventilated through a breather filter 26.

The base 11 carries thereon a magnetic disk 12, for use as a recording medium, and a drive section. The drive section comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record and reproduce data on and from the disk 12. The head actuator 14 supports the heads 33 for movement relative to the surfaces of the disk 12. The VCM 16 pivots and positions the head actuator. The base 11 further carries a ramp loading mechanism 18, inertial latch 20, and board unit 17. The ramp loading mechanism 18 holds the magnetic heads 33 in a position off the magnetic disk 12 when the heads are moved to the outermost periphery of the disk. The inertial latch 20 holds the head actuator 14 in a retracted position if the HDD is jolted, for example. Electronic components, such as a preamplifier, head IC, etc., are mounted on the board unit 17.

A control circuit board 25 is attached to the outer surface of the base 11 by screws such that it faces a bottom wall of the base 11. The circuit board 25 controls the operations of the spindle motor 13, VCM 16, and magnetic heads 33 through the board unit 17.

As shown in FIGS. 1 and 2, the magnetic disk 12 is constructed as a perpendicular magnetic recording film medium. The disk 12 comprises a substrate 19 formed of a nonmagnetic disk with a diameter of, for example, about 2.5 inches. A soft magnetic layer 23 for use as an underlayer is formed on each surface of the substrate 19. The soft magnetic layer 23 is overlain by a perpendicular magnetic recording layer 22, which has a magnetic anisotropy perpendicular to the disk surface. Further, a protective film 24 is formed on the recording layer 22.

As shown in FIG. 1, the magnetic disk 12 is coaxially fitted on the hub of the spindle motor 13 and clamped and secured to the hub by a clamp spring 21, which is attached to the upper end of the hub by screws. The disk 12 is rotated at a predetermined speed in the direction of arrow B by the spindle motor 13 for use as a drive motor. The head actuator 14 comprises a bearing 15 secured to the bottom wall of the base 11 and a plurality of arms 27 extending from the bearing. The arms 27 are arranged parallel to the surfaces of the magnetic disk 12 and at predetermined intervals and extend in the same direction from the bearing 15. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each magnetic head 33 is supported on an extended end of its corresponding suspension 30 by a gimbal spring 41. Each suspension 30, gimbal spring 41, and magnetic head 33 constitute a head gimbal assembly. The head actuator 14 may comprise a so-called E-block in which a sleeve of the bearing 15 and a plurality of arms are formed integrally with one another.

As shown in FIG. 2, each magnetic head 33 comprises a substantially cuboid slider 42 and read/write head section 44 on an outflow end (trailing end) of the slider. A head load L directed to the surface of the magnetic disk 12 is applied to each head 33 by the elasticity of the suspension 30. The two arms 27 are arranged parallel to and spaced apart from each other, and the suspensions 30 and heads 33 mounted on these arms face one another with the magnetic disk 12 between them.

Each magnetic head 33 is electrically connected to a main FPC 38 (described later) through a relay flexible printed circuit (FPC) board 35 secured to the suspension 30 and arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 11. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 15 in the direction opposite to the arms 27 and a voice coil supported on the support frame. When the head actuator 14 is assembled to the base 11, the voice coil is located between a pair of yokes 34 that are secured to the base 11. Thus, the voice coil, along with the yokes and a magnet secured to one of the yokes, constitutes the VCM 16.

If the voice coil of the VCM 16 is energized with the magnetic disk 12 rotating, the head actuator 14 pivots, whereupon each magnetic head 33 is moved to and positioned on a desired track of the disk 12. As this is done, the head 33 is moved radially relative to the disk 12 between the inner and outer peripheral edges of the disk.

Figure 3:
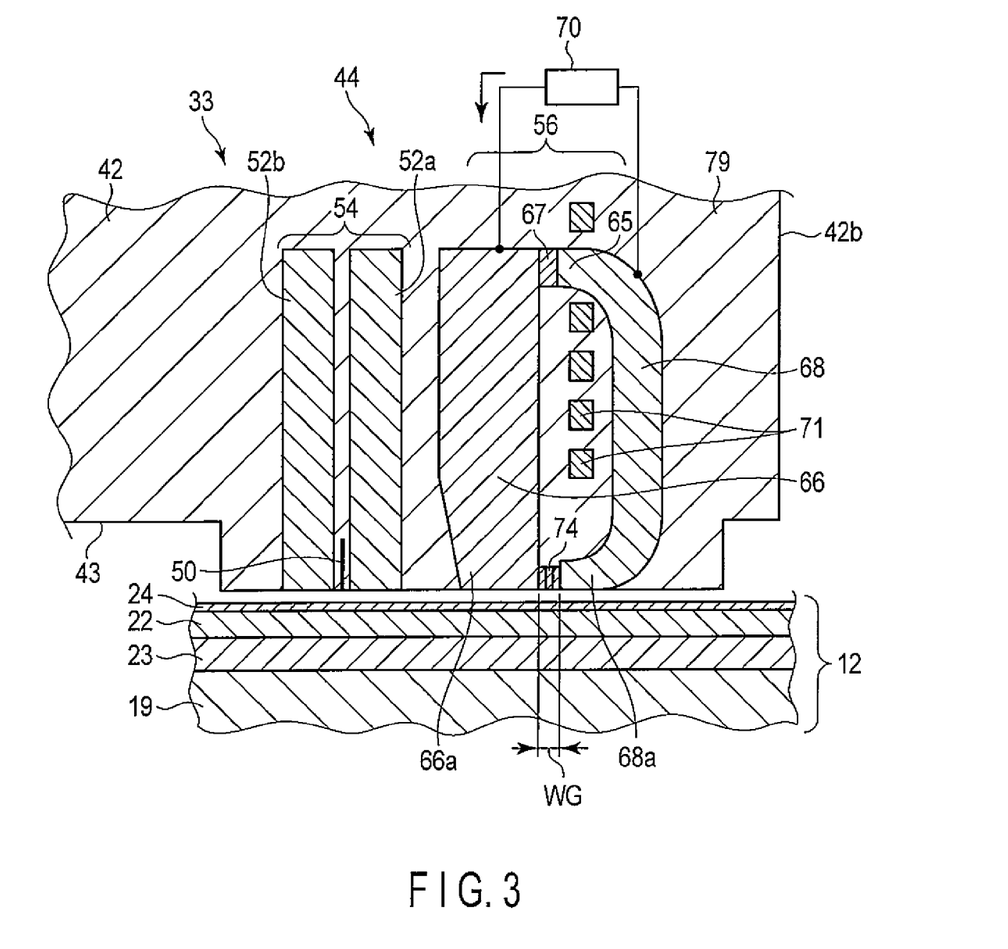
FIG. 3 is an enlarged sectional view showing a head section of the magnetic head.
Figure 4:
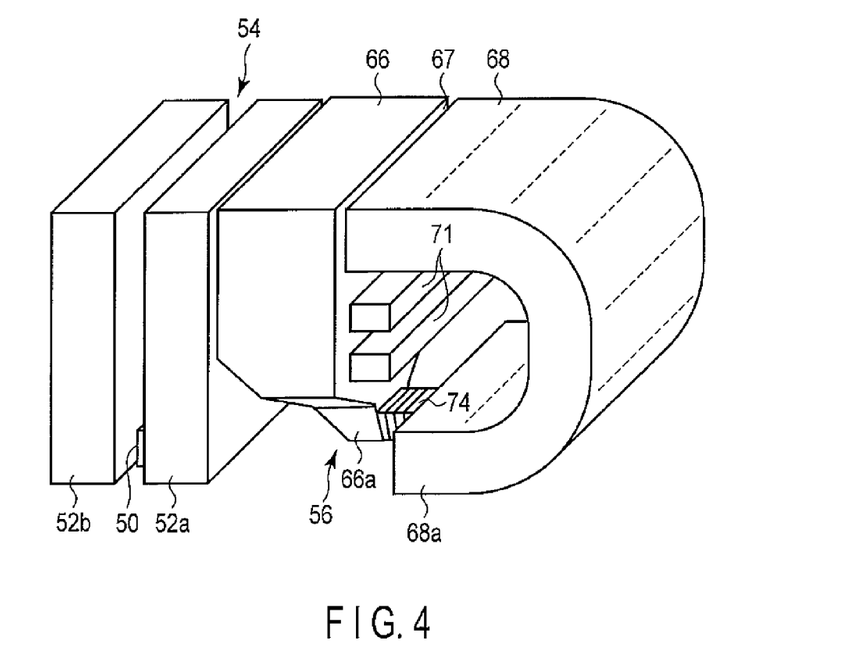
FIG. 4 is a perspective view schematically showing a recording head and reproduction head.

The following is a detailed description of a configuration of one of the magnetic heads 33. FIG. 3 is an enlarged sectional view showing the head section 44 of the head 33, and FIG. 4 is a perspective view schematically showing a recording head and reproduction head.

As shown in FIGS. 2 and 3, the magnetic head 33 is constructed as a flying head, which comprises the substantially cuboid slider 42 and head section 44 formed on the outflow or trailing end of the slider. The slider 42 is formed of, for example, a sintered body (AlTic) containing alumina and titanium carbide, and the head section 44 of a thin film.

The slider 42 has a rectangular disk-facing surface or air-bearing surface (ABS) 43 configured to face a surface of the magnetic disk 12. The slider 42 is kept floating a predetermined distance from the disk surface by airflow C that is produced between the disk surface and the ABS 43 as the disk 12 rotates. The direction of airflow C is coincident with the direction of rotation B of the disk 12. The slider 42 is disposed on the surface of the disk 12 in such a manner that the longitudinal direction of the ABS 43 is substantially coincident with the direction of airflow C.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIGS. 3 and 4, the head section 44 is constructed as a dual-element magnetic head, comprising a reproduction head 54 and recording head 56 formed on the trailing end 42b of the slider 42 by thin-film processing.

The reproduction head 54 comprises a magnetic film 50 having a magnetoresistive effect and shielding films 52a and 52b disposed on the trailing and leading sides, respectively, of the magnetic film such that they sandwich the magnetic film between them. The respective lower ends of the magnetic film 50 and shielding films 52a and 52b are exposed in the ABS 43 of the slider 42.

The recording head 56 is located nearer to the trailing end 42b of the slider 42 than the reproduction head 54. As shown in FIGS. 3 and 4, the recording head 56 comprises a main pole 66 of a high-saturation-magnetization material, trailing shield (or return pole) 68, recording coil 71, and spin-torque oscillator 74 as a high-frequency oscillator. The main pole 66 produces a recording magnetic field perpendicular to the surfaces of the magnetic disk 12. The trailing shield 68 is located on the trailing side of the main pole 66 and serves to efficiently close a magnetic path through the soft magnetic layer 23 just below the main pole. The recording coil 71 is located so that it is wound around a magnetic circuit including the main pole 66 and trailing shield 68 to pass magnetic flux to the main pole while a signal is being written to the disk 12. The spin-torque oscillator 74 is a laminated body comprising magnetic and nonmagnetic conductors, disposed between the distal end portion 66a of the main pole 66 and the trailing shield 68 and opposite the ABS 43.

A power supply 70 is connected to the main pole 66 and trailing shield 68, and a current circuit is constructed such that current from the power supply can be supplied in series through the main pole 66, spin-torque oscillator 74, and trailing shield 68.

The main pole 66 extends substantially perpendicular to the surfaces of the magnetic disk 12. The distal end portion 66a of the main pole 66 on the disk side is tapered toward the disk surface. The distal end portion 66a of the main pole 66 has, for example, a rectangular cross-section, and the distal end surface of main pole is exposed in the ABS 43 of the slider 42. In the present embodiment, the width of the distal end portion 66a of the main pole 66 is substantially equal to the track width of the magnetic disk 12.

The trailing shield 68 is substantially U-shaped and its distal end portion 68a has an elongated rectangular shape. The distal end surface of the trailing shield 68 is exposed in the ABS 43 of the slider 42. The leading end surface of the distal end portion 68a extends transversely relative to the tracks of the magnetic disk 12. This leading end surface is opposed substantially parallel to the trailing end surface of the main pole 66 with write gap WG therebetween. Side shields may be arranged individually on the opposite sides of the main pole 66 in the track-width direction. The side shields enable reduction of fringe magnetic fields for adjacent tracks, thereby improving the recording density transversely relative to the tracks.

The trailing shield 68 is connected to the main pole 66 through a back gap portion 67 formed of an insulator, such as $SiO_2$, in a position separated from the ABS 43. This insulator electrically insulates the main pole 66 and trailing shield 68 from each other.

Figure 5:
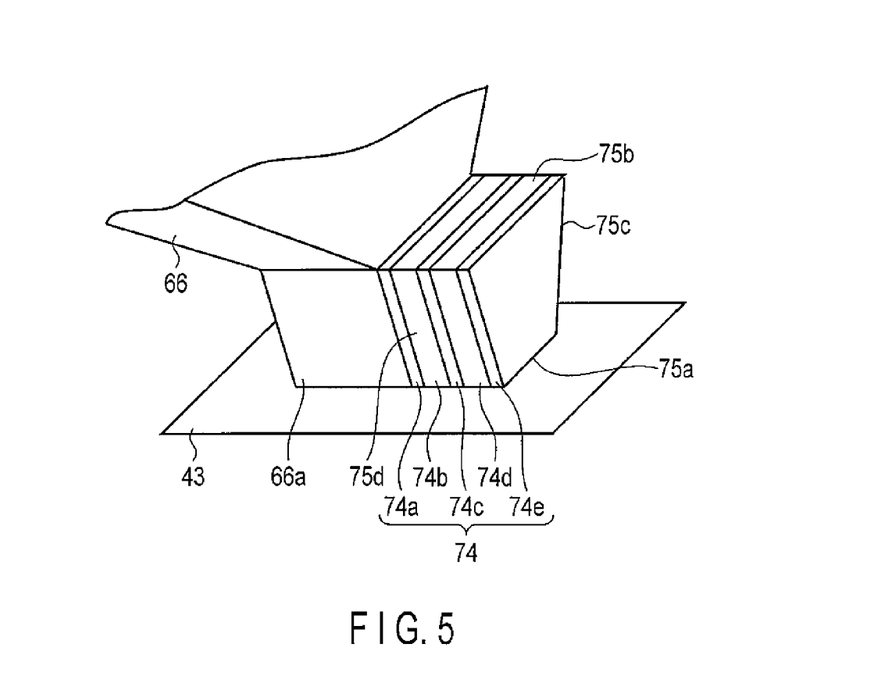
FIG. 5 is an enlarged perspective view schematically showing the distal end portion of a main pole of the recording head and a high-frequency oscillator.
Figure 6:
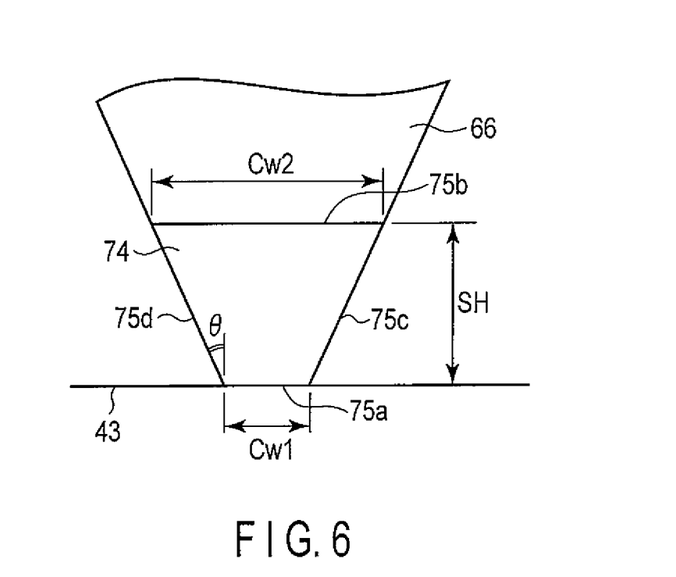
FIG. 6 is a front view showing the distal end portion of the main pole and the high-frequency oscillator.

FIG. 5 is a perspective view showing the tapered distal end portion 66a of the main pole 66 and the high-frequency oscillator, and FIG. 6 is a front view showing the distal end portion of the main pole and the spin-torque oscillator 74. As shown in FIGS. 3 to 6, the oscillator 74 is interposed between the distal end portion 66a of the main pole 66 and the trailing shield 68. The oscillator 74 is formed by sequentially laminating an underlayer 74a, spin injection layer (second magnetic layer) 74b, interlayer 74c, generating layer (first magnetic layer) 74d, and cap layer 74e, from the side of the main pole 66 to the side of the trailing shield 68. The generating layer 74d is an about 15-nm thick soft magnetic film of Fe—Co—Ni alloy with a saturation magnetic flux density as high as 2T. The interlayer 74c is an about 3-nm thick film of copper having a long spin-diffusion length. Further, the spin injection layer 74b is an artificial lattice film of Co/Ni having high coercive force and high spin polarization ratio. Although the spin injection layer 74b, interlayer 74c, and generating layer 74d are stacked in the order named, the generating layer, interlayer, and spin injection layer may alternatively be stacked in this order.

The spin-torque oscillator 74 has its lower end surface 75a exposed in the ABS 43 and is located substantially flush with the distal end surface of the main pole 66 with respect to the surface of the magnetic disk 12. Specifically, the lower end surface 75a of the oscillator 74 is located flush with the ABS 43 of the slider 42 and substantially parallel to the surfaces of the magnetic disk 12. According to the present embodiment, as described later, the spin-torque oscillator 74 and main pole 66 are etched by ion milling using the same resist pattern after the underlayer, spin injection layer, interlayer, generating layer, and cap layer of the spin-torque oscillator are successively formed on the main pole 66. Thus, the distal end portion 66a of the main pole 66 located near the ABS 43 has substantially the same shape as the spin-torque oscillator 74 in the core-width direction.

As shown in FIGS. 5 and 6, the size of the distal end portion 66a of the main pole 66 in the core-width direction increases with distance from the ABS 43. Likewise, the spin-torque oscillator 74 is configured so that its width in the core-width direction (track-width direction) is the smallest at the lower end surface 75a and increases with distance from the ABS 43, that is, from the lower end surface 75a. The oscillator 74 comprises an upper end surface 75b, which is opposed parallel to the lower end surface 75a, and opposite side surfaces 75c and 75d, which extend linearly spreading from the opposite sides of the lower end surface toward the upper end surface. Width CW2 of the upper end surface 75b in the core-width direction is greater than width CW1 of the lower end surface 75a in the same direction. Thus, that surface of the spin-torque oscillator 74 opposite the main pole 66 has the shape of an inverted trapezoid.

Under the control of the control circuit board 25, the spin-torque oscillator 74 is supplied with direct current along its film thickness as voltage from the power supply 70 is applied to the main pole 66 and trailing shield 68. By this current supply, the magnetization of the generating layer 74d of the oscillator 74 can be rotated to produce a high-frequency magnetic field. In this way, the oscillator 74 applies the high-frequency magnetic field to the recording layer of the magnetic disk 12. Thus, the trailing shield 68 and main pole 66 serve as electrodes for perpendicular energization of the oscillator 74.

As shown in FIG. 6, element height SH of the spin-torque oscillator 74, that is, the distance between the lower and upper end surfaces 75a and 75b, and width CW1 of the lower end surface 75a were both fixed to 30 nm, spread angle θ (inclination to the direction perpendicular to the lower end surface 75a) of the side surfaces 75c and 75d were varied from 0 to 45°, and ratio CW2/CW1 between widths CW2 and CW1 of the upper and lower end surfaces 75b and 75a was varied from 1 to 3. In this state, the change of magnetization oscillation of the oscillator 74 was measured. Recording current was applied to the recording head 56, a magnetic field of 5 kOe was applied to the oscillator 74, and drive current density J for the oscillator was adjusted to $2\times10^8$ $A/cm^2$.

Figure 7:
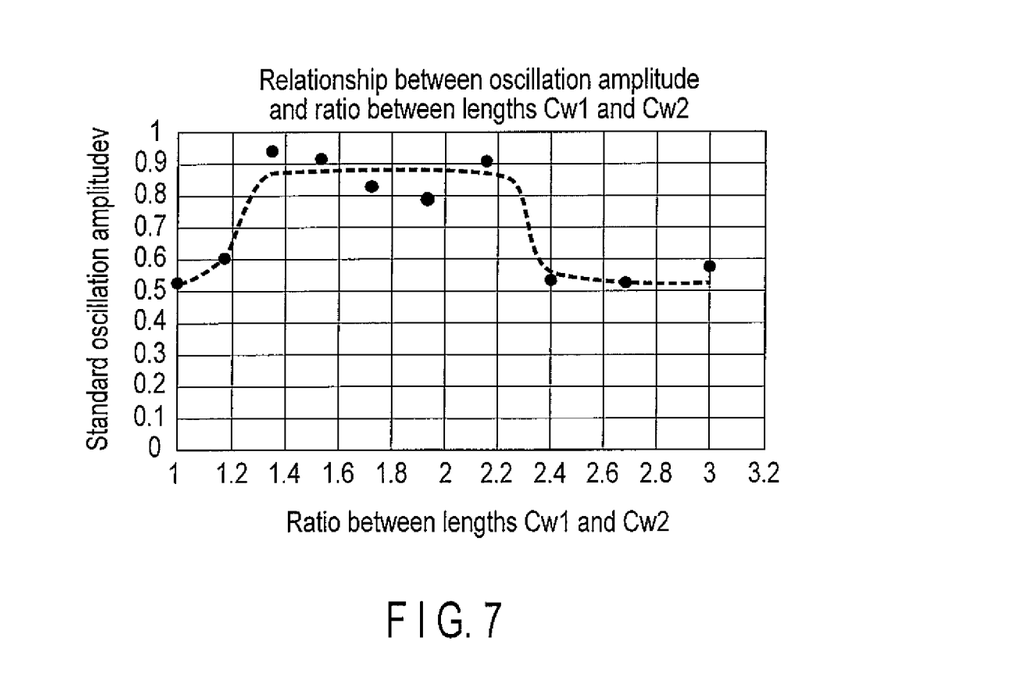
FIG. 7 is a diagram showing the relationship between the oscillation amplitude of magnetization of the high-frequency oscillator and the ratio (CW2/CW1) between the respective widths of lower and upper end surfaces.

FIG. 7 shows the relationship between the standard oscillation amplitude of magnetization of the spin-torque oscillator 74 and ratio CW2/CW1 between widths CW1 and CW2. If the standard oscillation amplitude is 1, the amplitude of the spin-torque oscillator has a maximum, and the produced high-frequency magnetic field is maximal. As the standard oscillation amplitude is reduced, the produced high-frequency magnetic field is reduced, and it becomes difficult to achieve a stable recording/reproduction characteristic. It is evident that the standard oscillation amplitude of the spin-torque oscillator can be increased by setting ratio CW2/CW1 between 1.3 and 2.2. If ratio CW2/CW1 is set within this range, a magnetic domain structure in the generating layer of the spin-torque oscillator is stabilized, so that large oscillation amplitude can be obtained with low drive current density J. Consequently, a great high-frequency magnetic field intensity can applied to the recording medium, so that a stable recording/reproduction characteristic can be achieved. In the present embodiment, the spin-torque oscillator 74 is formed so that width CW1 of its lower end surface 75a is smaller than width CW2 of its upper end surface 75b (CW1<CW2) and that ratio CW2/CW1 ranges from 1.3 to 2.2.

With drive current density J described above, the standard oscillation amplitude is about 0.5 if ratio CW2/CW1 between widths CW1 and CW2 is 1, that is, if the plane shape of the spin-torque oscillator is rectangular. Thus, a sufficiently large high-frequency magnetic field cannot be produced, so that it is difficult to achieve a stable recording/reproduction characteristic.

Figure 8:
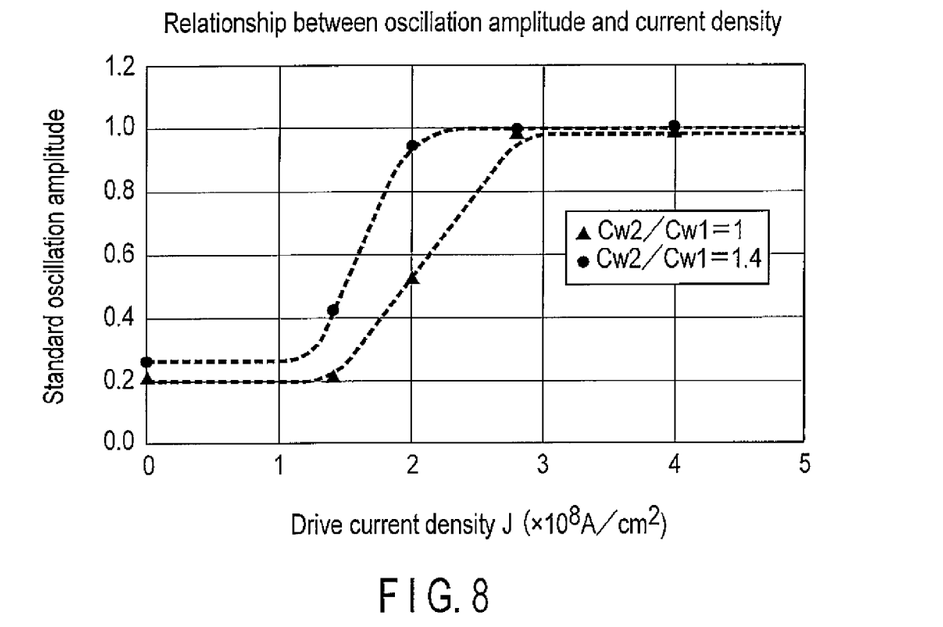
FIG. 8 is a diagram showing the relationship between the oscillation amplitude of the high-frequency oscillator and drive current density.

FIG. 8 comparatively shows the relationship between drive current density J and the oscillation amplitude for spin-torque oscillators with ratios CW2/CW1 of 1 and 1.4. As seen from this drawing, the spin-torque oscillator with ratio CW2/CW1 of 1.4 can provide larger oscillation amplitude with lower drive current.

Figure 9:
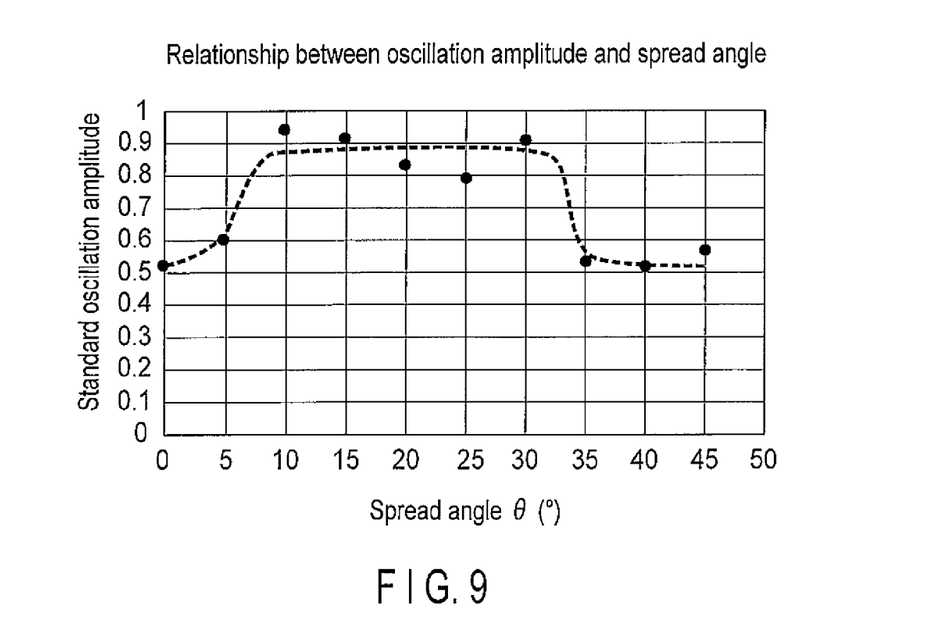
FIG. 9 is a diagram showing the relationship between the oscillation amplitude of the high-frequency oscillator and spread angle.

FIG. 9 is a diagram showing the relationship between the standard oscillation amplitude of magnetization of the generating layer of the spin-torque oscillator and spread angle $\theta$. The standard oscillation amplitude of the generating layer increases with spread angle $\theta$ ranging from about 8 to 32°. If spread angle $\theta$ is within this range, the magnetic domain structure in the generating layer is stabilized during the oscillation of the spin-torque oscillator, so that large oscillation amplitude can be obtained with low drive current density J. Consequently, a great high-frequency magnetic field intensity can applied to the recording medium, so that a stable recording/reproduction characteristic can be achieved.

Figure 10:
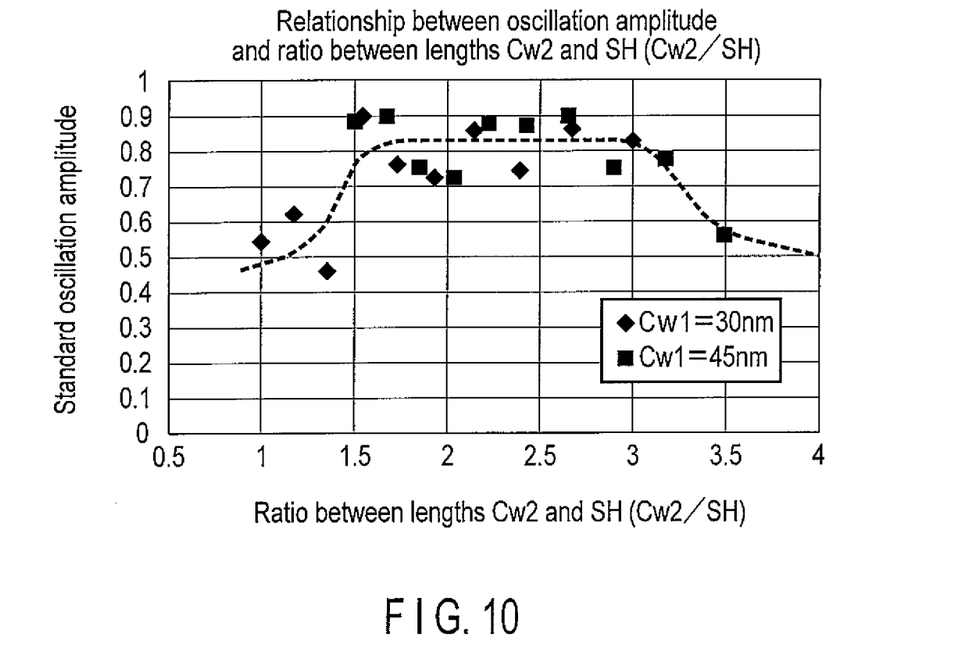
FIG. 10 is a diagram showing the relationship between the oscillation amplitude of the high-frequency oscillator and the ratio (CW2/SH) between the width of the upper end surface and element height.

FIG. 10 is a diagram showing the relationship between the standard oscillation amplitude of magnetization of the spin-torque oscillator 74 and ratio CW2/SH between core width CW2 at the upper end surface 75b of the spin-torque oscillator and element height SH. Two spin-torque oscillators with element height SH fixed to 30 nm and core widths CW1 of 30 and 45 nm at the lower end surface 75a were prepared, and the respective high-frequency oscillation amplitudes of these oscillators were measured and compared. The magnetic field applied to the spin-torque oscillators is at 6 kOe, and the drive current density is $2.5 \times 10^8$ A/cm$^2$. As seen from FIG. 10, the standard oscillation amplitude of the generating layer can be increased to enable application of a high-intensity high-frequency magnetic field to the medium by setting ratio CW2/SH between core width CW2 of the lower end surface of each spin-torque oscillator and element height SH between 1.5 and 3.3. Consequently, a stable recording/reproduction characteristic can be achieved.

Figure 11:
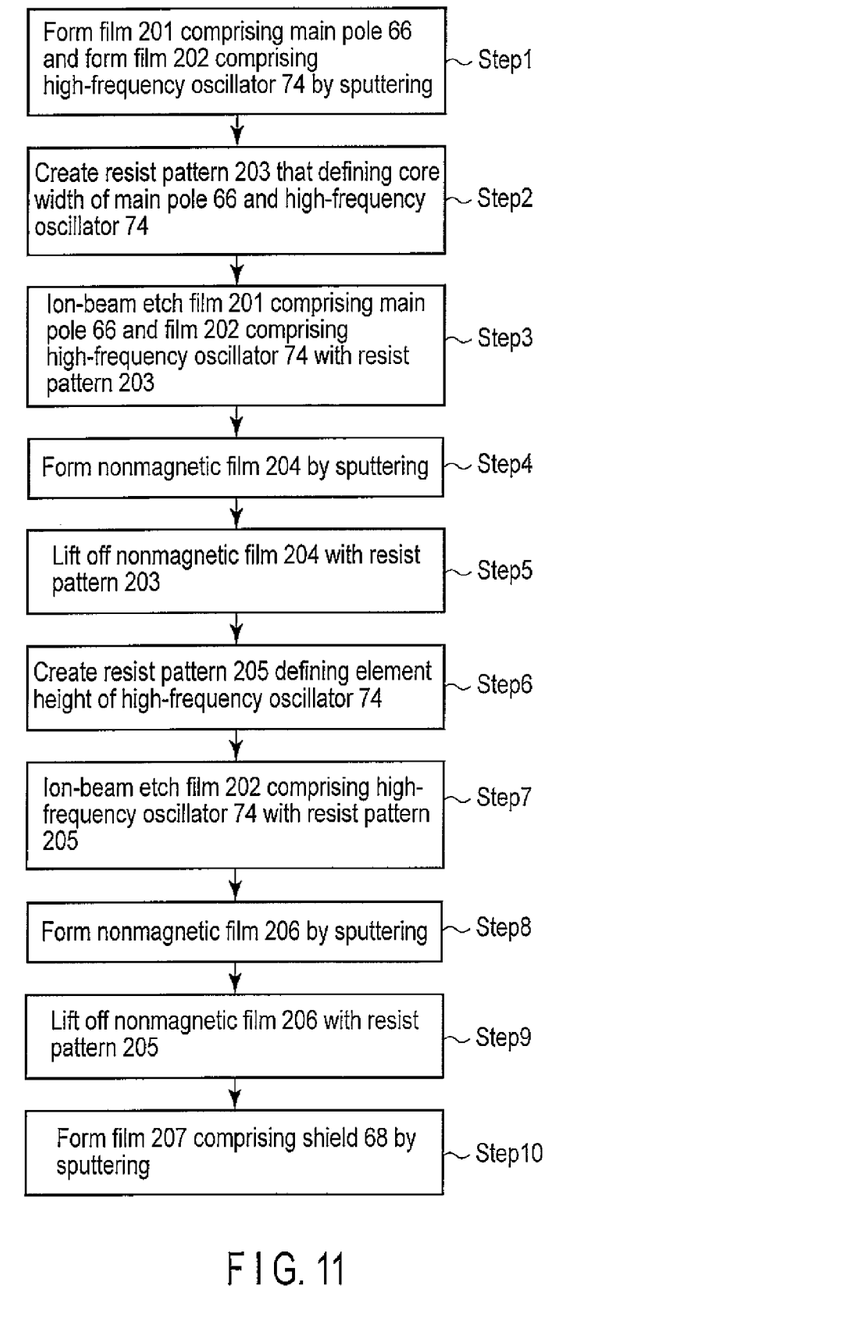
FIG. 11 is a flowchart showing a manufacturing process for the recording head.

The following is a description of a manufacturing process for the recording head 56 constructed in this manner. FIG. 11 is a flowchart showing the manufacturing process, and FIGS. 12 and 13 show sectional views and front views illustrating various steps of the process.

Figure 12:
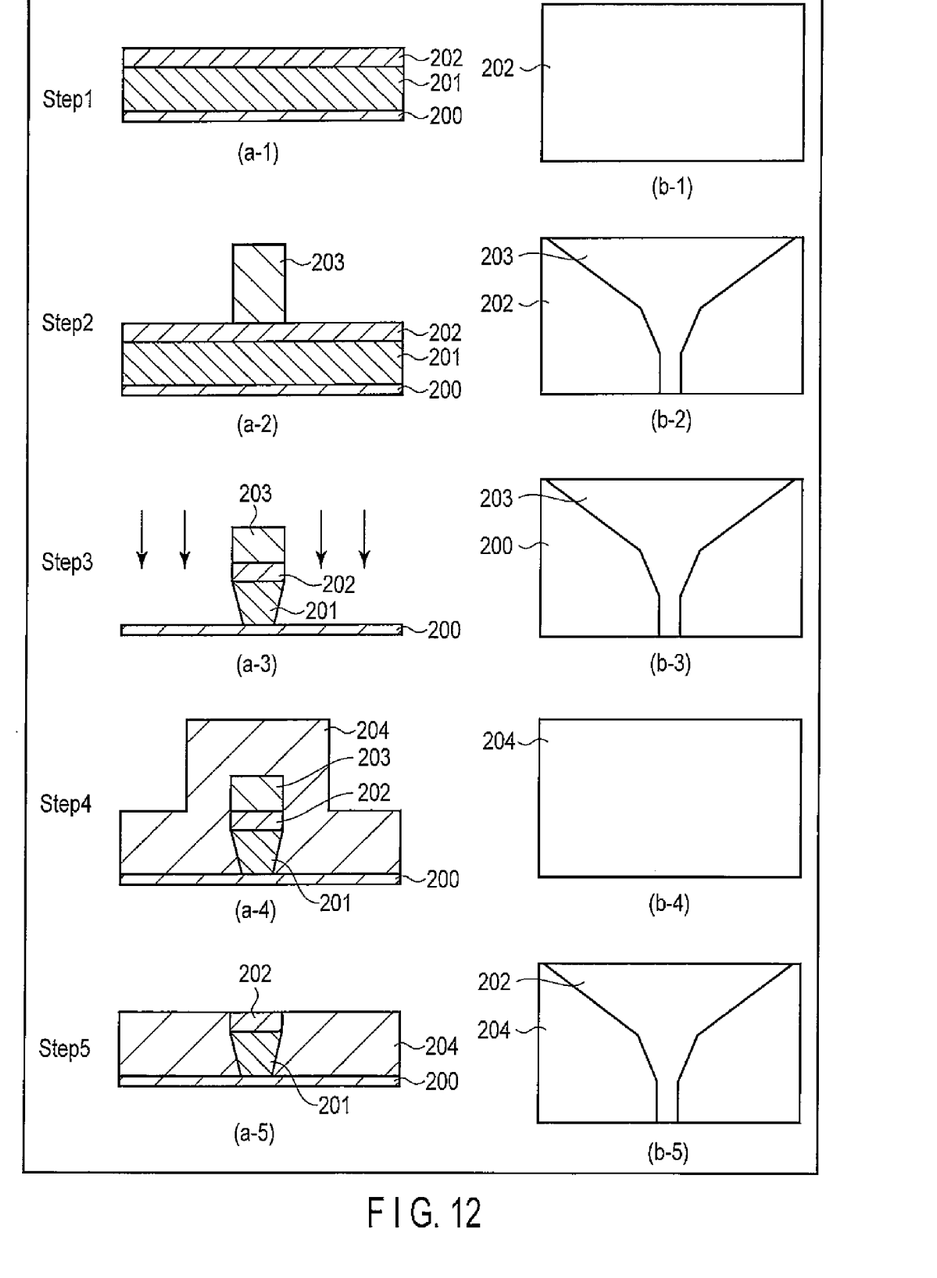
FIG. 12 shows sectional views and front views showing the manufacturing process for the recording head.

As shown in FIG. 11 and FIGS. 12(a-1) and 12(b-1), a film 201 to constitute the main pole 66 is first formed on an underlayer 200 of a nonmagnetic metal by sputtering, and a film 202 comprising the spin-torque oscillator 74 is formed on the film 201 by sputtering (Step 1).

Then, as shown in FIGS. 12(a-2) and 12(b-2), a resist pattern 203 that defines the core width of the main pole 66 and spin-torque oscillator 74 is created (Step 2). Successively, as shown in FIGS. 12(a-3) and 12(b-3), the films 202 and 201 are formed into the shapes of the main pole 66 and spin-torque oscillator 74 by ion-beam etching (IBE) using the resist pattern 203 (Step 3). After a nonmagnetic film 204 is formed by sputtering (Step 4), as shown in FIGS. 12(a-4) and 12(b-4), it is lifted off by the resist pattern 203 (Step 5), as shown in FIGS. 12(a-5) and 12(b-5).

Figure 13:
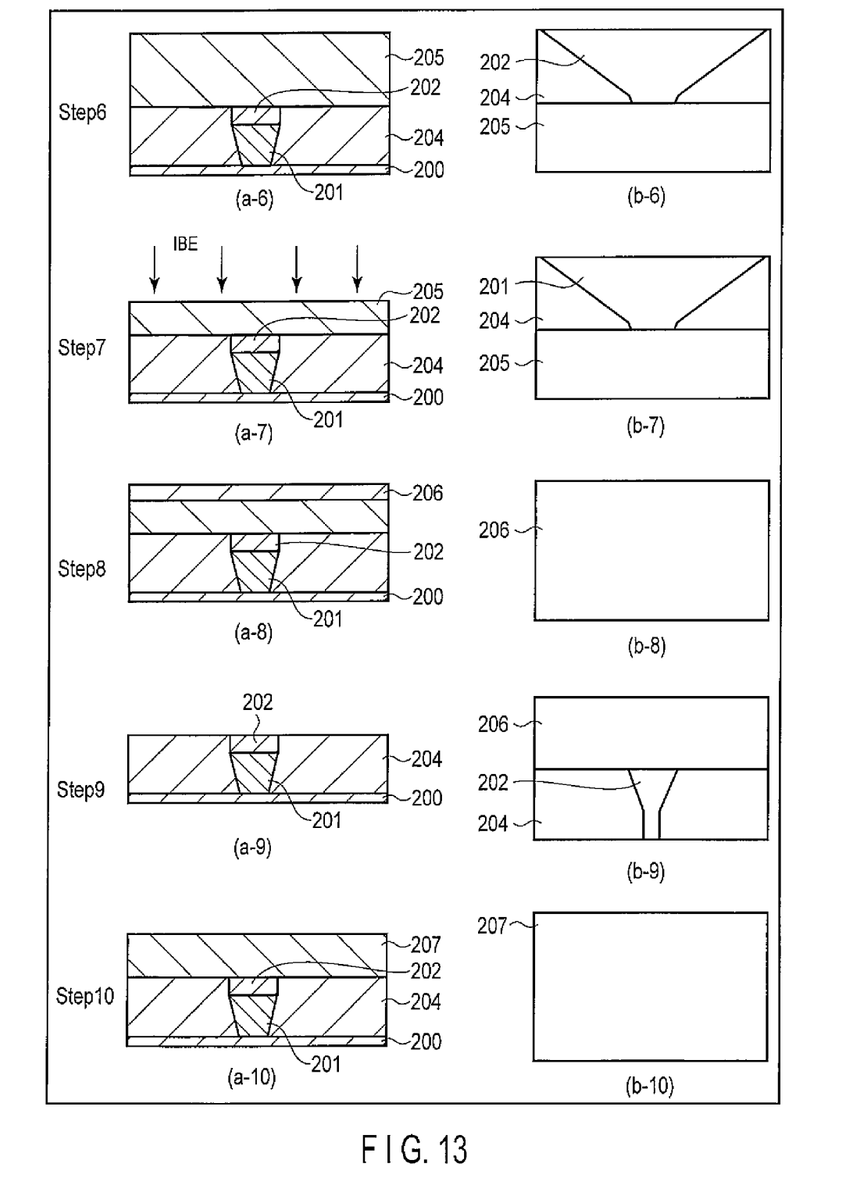
FIG. 13 shows sectional views and front views showing the manufacturing process for the recording head.

Then, a resist pattern 205 that defines the element height of the spin-torque oscillator is created (Step 6), as shown in FIGS. 13(a-6) and 13(b-6), and the film 202 comprising the spin-torque oscillator is etched by IBE using the resist pattern 205 (Step 7), as shown in FIGS. 13(a-7) and 13(b-7). Then, as shown in FIGS. 13(a-8) and 13(b-8), a nonmagnetic film 206 is formed by sputtering (Step 8).

As shown in FIGS. 13(a-9) and 13(b-9), the nonmagnetic film 206 is lifted off with the resist pattern 205 (Step 9). Then, as shown in FIGS. 13(a-10) and 13(b-10), a film 207 comprising the trailing shield is formed by sputtering (Step 10). After the recording coil, an upper part of the shield, etc., are then formed, polishing is performed to form the ABS, and the element height of the spin-torque oscillator is adjusted to SH.

The recording head 56 having the above-described structure is formed in this process.

When the VCM 16 is activated, according to the HDD constructed in this manner, the head actuator 14 pivots, whereupon each magnetic head 33 is moved to and positioned on a desired track of the magnetic disk 12. As the magnetic disk 12 rotates, moreover, the magnetic head 33 is caused to fly by airflow C that is produced between the disk surface and the ABS 43. When the HDD is operating, the ABS 43 of the slider 42 faces the disk surface with a gap therebetween. As shown in FIG. 2, the magnetic head 33 is caused to fly in an inclined posture such that the recording head 56 of the head section 44 is located closest to the surface of the disk 12. In this state, the reproduction head 54 reads recorded data from the disk 12, while the recording head 56 writes data to the disk.

In writing data, direct current is passed through the spin-torque oscillator 74 to produce a high-frequency magnetic field, which is applied to the perpendicular magnetic recording layer 22 of the magnetic disk 12. Further, the main pole 66 is excited by the recording coil 71. Data is recorded with a desired track width in such a manner that a perpendicular recording magnetic field is applied to the recording layer 22 of the magnetic disk 12 just below the main pole. Magnetic recording with high coercivity and high magnetically anisotropic energy can be achieved by superposing the high-frequency magnetic field on the recording magnetic field. Further, the core width of the lower end surface of the spin-torque oscillator 74 is made smaller than that of the upper end surface, and the ratio between these core widths is set between 1.3 and 2.5. If this is done, the standard oscillation amplitude of the generating layer increases, so that a high-intensity high-frequency magnetic field can be applied to the magnetic disk with low drive current, and a stable recording/reproduction characteristic can be achieved.

Thus, there can be provided a magnetic recording head, capable of oscillating with low drive current and achieving a great high-frequency magnetic field intensity and stable recording/reproduction characteristic, a head gimbal assembly provided with the same, and a disk drive.

The following is a description of magnetic heads of HDDs according to alternative embodiments. In the description of these alternative embodiments to follow, like reference numbers are used to designate the same parts as those of the first embodiment, and a detailed description thereof is omitted. The following is a detailed description focused on different parts.

Second Embodiment

Figure 14:
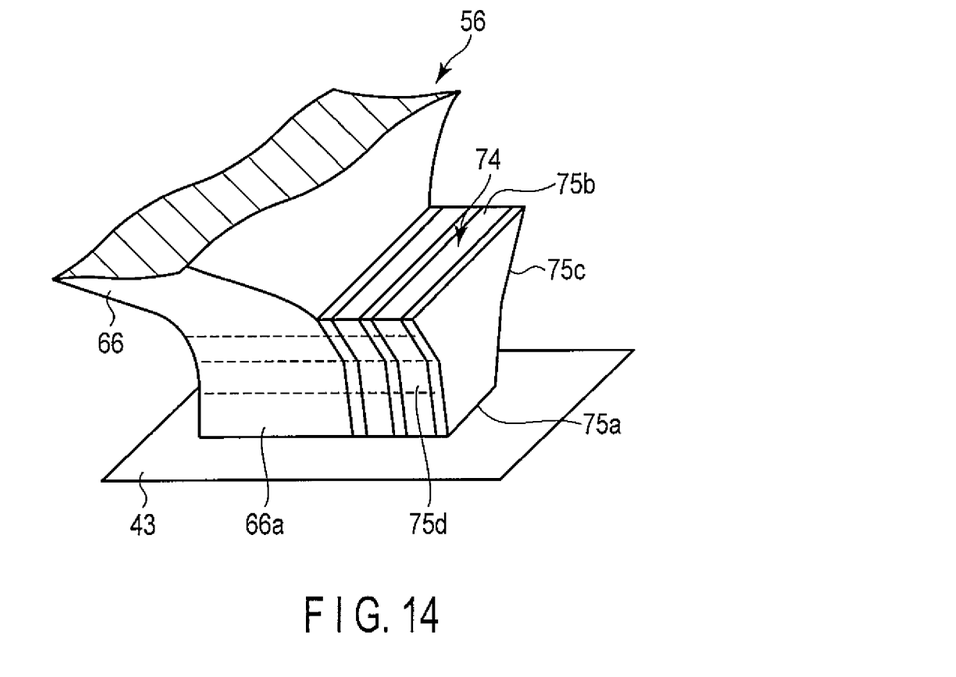
FIG. 14 is an enlarged perspective view schematically showing the distal end portion of a main pole of a recording head and a high-frequency oscillator of an HDD according to a second embodiment.
Figure 15:
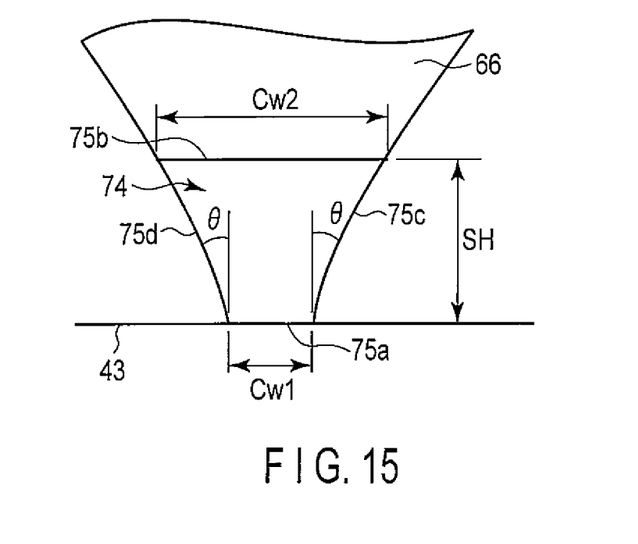
FIG. 15 is a front view showing the distal end portion of the main pole of the recording head and the high-frequency oscillator of the HDD according to the second embodiment.

FIGS. 14 and 15 are perspective and front views, respectively, showing a recording head of a magnetic head of an HDD according to a second embodiment. According to the present embodiment, the core width (width in the track-width direction) of a spin-torque oscillator 74 is the smallest at a lower end surface 75a that is flush with an ABS 43, continuously increases with distance from the ABS, and becomes the largest at an upper end surface 75b parallel to the lower end surface 75a. Opposite side surfaces 75c and 75d of the oscillator 74 extend in an outward curve, not in a straight line, from the lower end surface 75a to the upper end surface 75b.

Also in this case, the standard oscillation amplitude of a spin-torque oscillator can be increased by setting the ratio between the core widths of the spin-torque oscillator 74 at the lower and upper end surfaces 75a and 75b between about 1.3 and 2.2. Thus, a high-intensity high-frequency magnetic field can be applied to a medium, and a stable recording/reproduction characteristic can be achieved.

Third Embodiment

Figure 16:
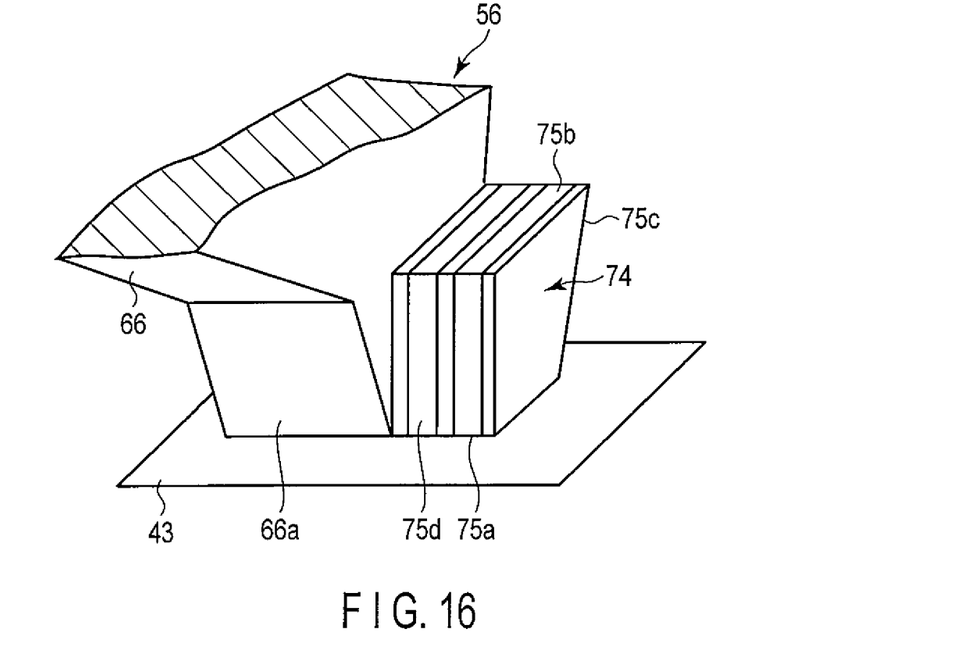
FIG. 16 is an enlarged perspective view schematically showing the distal end portion of a main pole of a recording head and a high-frequency oscillator of an HDD according to a third embodiment.
Figure 17:
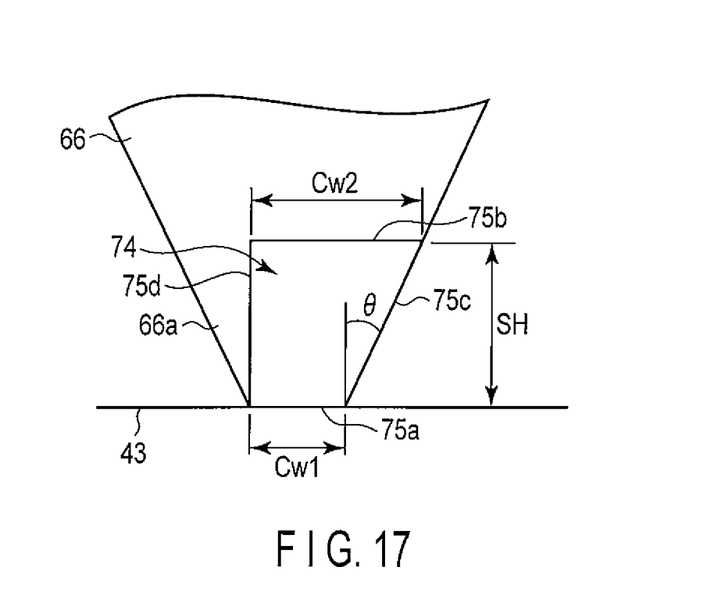
FIG. 17 is a front view showing the distal end portion of the main pole of the recording head and the high-frequency oscillator of the HDD according to the third embodiment.

FIGS. 16 and 17 are perspective and front views, respectively, showing a recording head of a magnetic head of an HDD according to a third embodiment. According to the present embodiment, the core width (width in the track-width direction) of a spin-torque oscillator 74 is the smallest at a lower end surface 75a that is flush with an ABS 43, continuously increases with distance from the ABS, and becomes the largest at an upper end surface 75b parallel to the lower end surface 75a. One side surface 75d of the oscillator 74 extends perpendicular to the lower end surface 75a and ABS 43 such that angle θ is zero. The other side surface 75c extends outward at spread angle θ of about 8 to 32° from the lower end surface 75a to the upper end surface 75b.

Also in this case, the standard oscillation amplitude of a spin-torque oscillator can be increased by setting the ratio between the core widths of the spin-torque oscillator 74 at the lower and upper end surfaces 75a and 75b between about 1.3 and 2.2. Thus, a high-intensity high-frequency magnetic field can be applied to a medium, and a stable recording/reproduction characteristic can be achieved.

According to the various embodiments described above, there can be provided a magnetic recording head, capable of oscillating with low drive current and achieving a great high-frequency magnetic field intensity and stable recording/reproduction characteristic, a head gimbal assembly provided with the same, and a disk drive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the shape of the spin-torque oscillator is not limited to the trapezoidal shape, and may be any other shape that satisfies the above-described relationship between the widths of the lower and upper end surfaces. The high-frequency oscillator is not limited to the spin-torque oscillator, and may be another high-frequency generation source, such as one using electric wires.

What is claimed is:

1. A magnetic recording head comprising:
    a main pole configured to apply a recording magnetic field to a recording layer of a recording medium;
    a trailing shield opposing the main pole with a write gap therebetween; and
    a high-frequency oscillator between a distal end portion of the main pole and the trailing shield, configured to produce a high-frequency magnetic field,
    the high-frequency oscillator comprising a lower end surface facing the recording medium, an upper end surface substantially parallel to the lower end surface, and opposite side surfaces extending from the lower end surface to the upper end surface, the width of the lower end surface in a track-width direction being smaller than that of the upper end surface,
    wherein the opposite side surfaces of the high-frequency oscillator extend spreading at an angle of 10 to 30° to the lower end surface.

2. The magnetic recording head of claim 1, wherein a ratio between the respective widths of the lower and upper end surfaces of the high-frequency oscillator ranges from 1.3 to 2.2.

3. The magnetic recording head of claim 1, wherein the high-frequency oscillator is configured so that a ratio between an element height between the lower and upper end surfaces and the width of the upper end surface ranges from 1.5 to 3.3.

4. The magnetic recording head of claim 1, wherein the distal end portion of the main pole facing the high-frequency oscillator has the same shape as the high-frequency oscillator.

5. A head gimbal assembly comprising:
    a slider;
    the magnetic recording head of claim 1 on the slider; and
    a suspension configured to support the slider.

6. The head gimbal assembly of claim 5, wherein a ratio between the respective widths of the lower and upper end surfaces of the high-frequency oscillator ranges from 1.3 to 2.2.

7. The head gimbal assembly of claim 5, wherein the high-frequency oscillator is configured so that a ratio between an element height between the lower and upper end surfaces and the width of the upper end surface ranges from 1.5 to 3.3.

8. The head gimbal assembly of claim 5, wherein the distal end portion of the main pole facing the high-frequency oscillator has the same shape as the high-frequency oscillator.

9. A disk drive comprising:
    a disk recording medium comprising a recording layer;
    a drive unit configured to support and rotate the recording medium; and
    the magnetic recording head of claim 1 configured to perform data processing on the recording medium.

10. The disk drive of claim 9, wherein a ratio between the respective widths of the lower and upper end surfaces of the high-frequency oscillator ranges from 1.3 to 2.2.

11. The disk drive of claim 9, wherein the high-frequency oscillator is configured so that a ratio between an element height between the lower and upper end surfaces and the width of the upper end surface ranges from 1.5 to 3.3.

12. The disk drive of claim 9, wherein the distal end portion of the main pole facing the high-frequency oscillator has the same shape as the high-frequency oscillator.

\* \* \* \* \*